Oct. 5, 1965
H. E. McGOWEN, JR
3,209,779
ORIFICE VALVE ASSEMBLY
Filed June 11, 1962
3 Sheets-Sheet 1
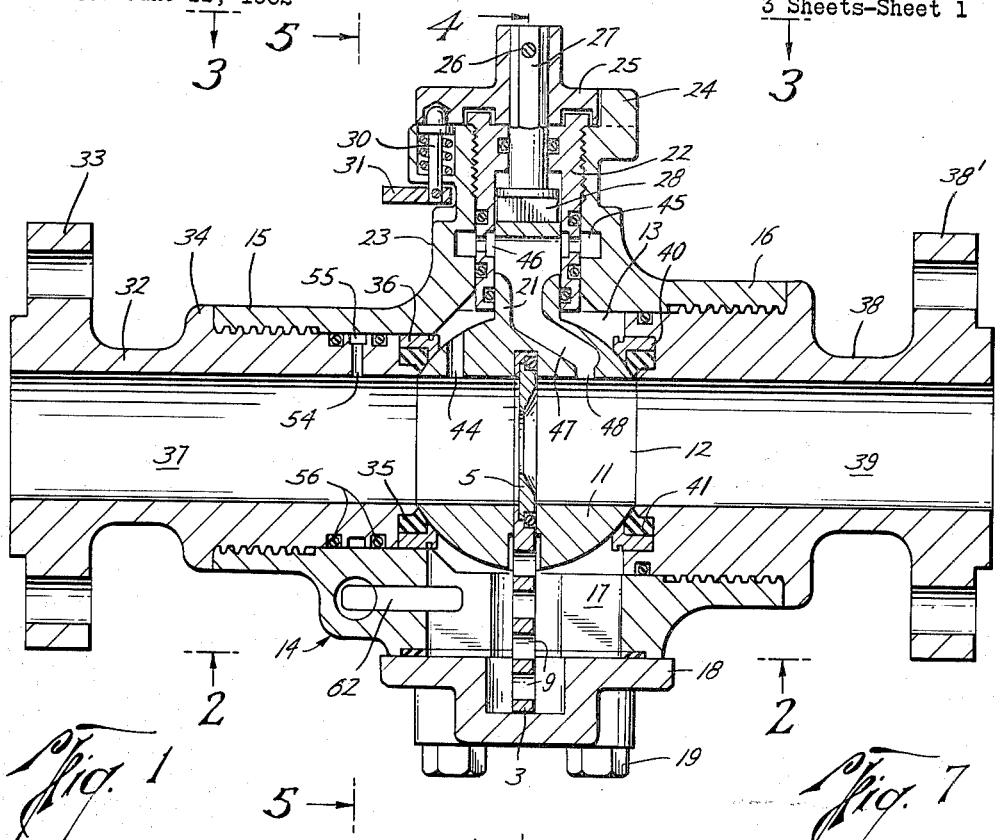
Fig. 1
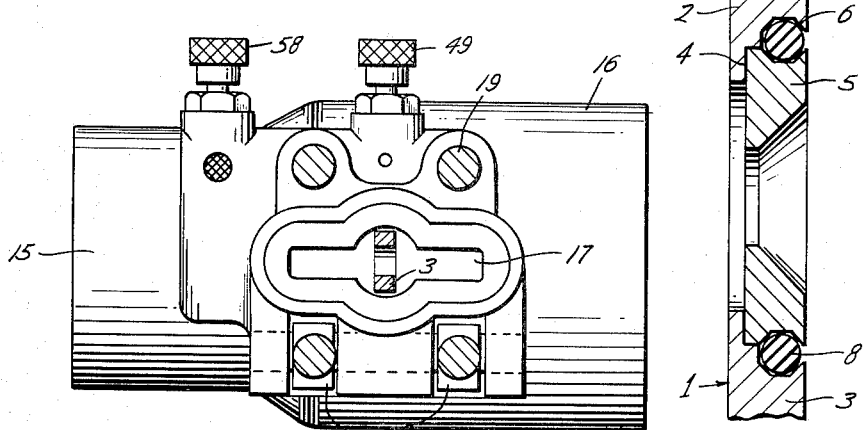
Fig. 2
Fig. 7
H. E. McGowen, Jr.
INVENTOR.
BY *GCHelmig*
ATTORNEY

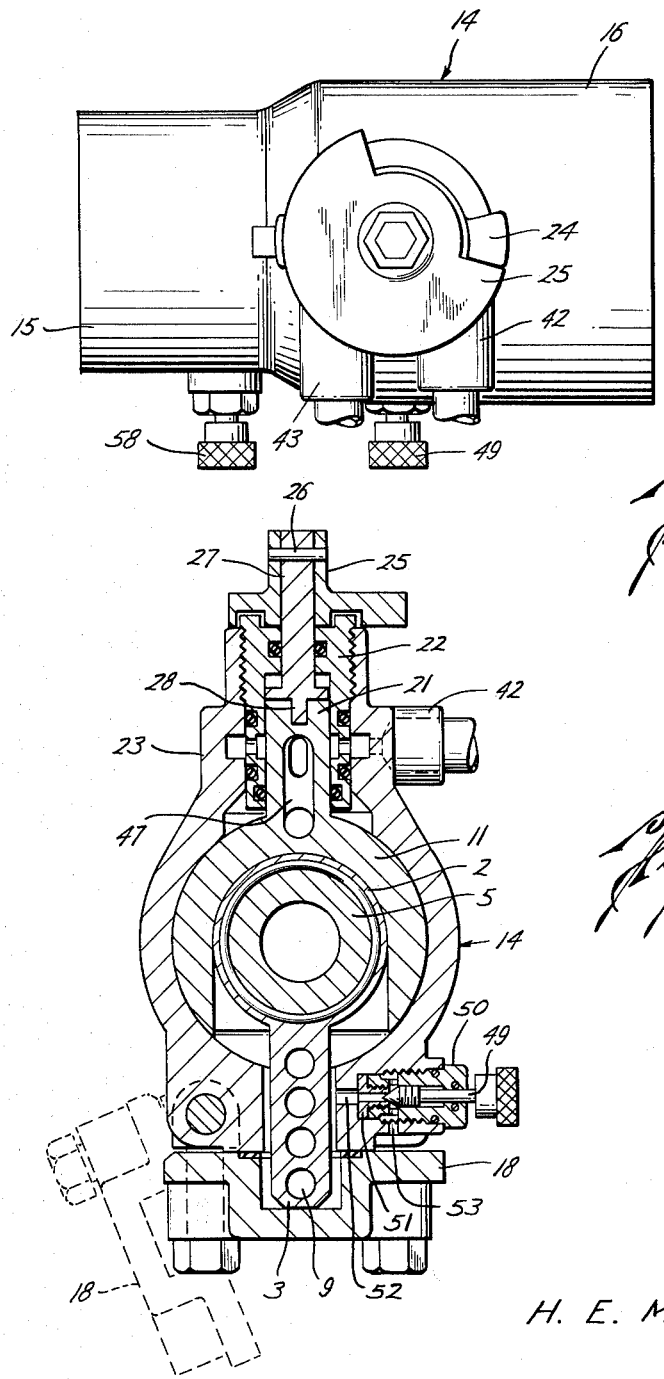

Oct. 5, 1965  H. E. McGOWEN, JR  3,209,779
ORIFICE VALVE ASSEMBLY
Filed June 11, 1962  3 Sheets-Sheet 3
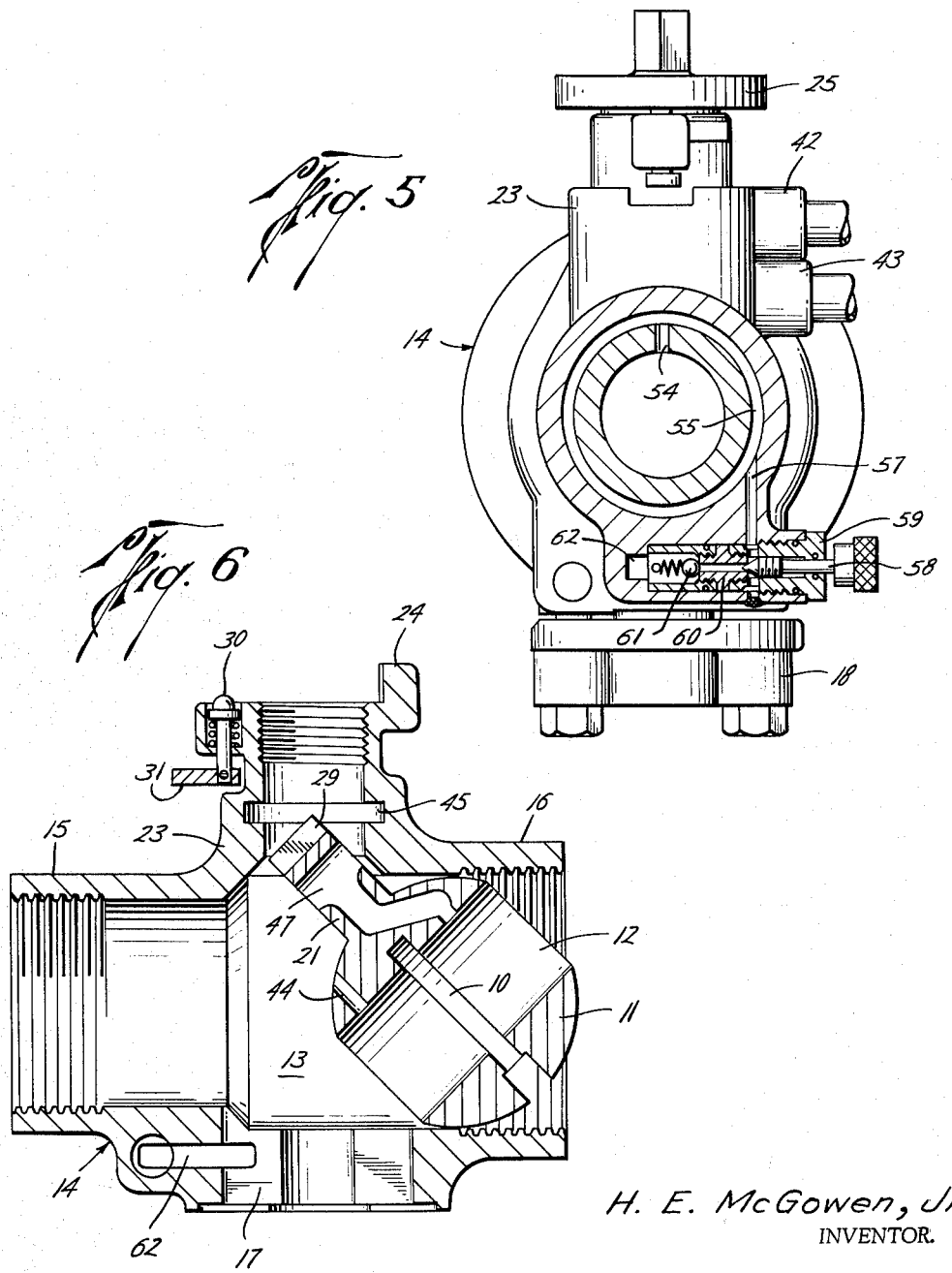
H. E. McGowen, Jr.
INVENTOR.
BY *(signature)*
ATTORNEY United States Patent Office 3,209,779
Patented Oct. 5, 1965

3,209,779
ORIFICE VALVE ASSEMBLY
Harold E. McGowen, Jr., % Camco, Incorporated,
P.O. Box 14,484, Houston, Tex.
Filed June 11, 1962, Ser. No. 201,553
6 Claims. (Cl. 137—327)

This invention relates to orifice valves of a type commonly installed in fluid flow conduits and fitted with an orifice element to enable gauging differential pressures on opposite sides of the orifice, and more particularly to an improved assembly of rotary valve plug and pipe connecting valve body arranged for insertion and removal of interchangeable orifice plates, each of a different orifice size, through the body wall and to and from flow volume controlling relation within the plug.

An object of the invention is to provide a more rugged and longer-lived valve assembly which is of compact bulk with a minimum amount of metal, shaped for strength and for economical manufacture and with safety pressure controls effective during the operation of attending to inspection and replacement of an orifice plate in a valve unit installed in a pressure fluid containing pipe line.

Another object of the invention is to provide a valve body arranged for securement interchangeably of sets of separately formed pipe coupling to serve a range of pressure ratings and different flange faces so that problems of production and of inventory stock costs can be reduced.

A further object is to provide an orifice carrier plate fitted to the rotary plug and within a thin slot to be aligned in the passage closing position of the plug with a mating thin slot in the body wall for a minimum of plate clearance and of wall weakening effect and which plate includes a dependent handle of a length to extend and bear within a depression of a detachable closure cover over the body wall slot and to be exposed for easy manipulation upon cover removal.

Still further objects of the invention are to provide for safe bleed down of internal pressure within the plug receiving body chamber following plug rotation to closed position and before detachment of the closure cover preparatory to orifice plate removal and additionally to provide for again equalizing pressures within the plug chamber and the pressure fluid inlet side of the valve body following reattachment of the closure cover and preparatory to return valve plug rotation from closed position back to open position so that rotational slide bearing between the plug and passage sealing ring surfaces can more readily occur without harm to the pliable sealing material employed.

Other objects and advantages will become apparent from the following detail specification having reference to the accompanying drawings wherein:

FIG. 1 is a longitudinal section of the improved valve unit in full assembly and normal open flow position of the parts;
FIG. 2 is a bottom plan and part sectional view as on line 2—2 of FIG. 1;
FIG. 3 is a top plan view on line 3—3 of FIG. 1;
FIG. 4 is a transverse section on line 4—4 of FIG. 1;
FIG. 5 is a transverse section on line 5—5 of FIG. 1;
FIG. 6 is a longitudinal section of the body and plug in one stage of final assembly; and
FIG. 7 is a large-scale section of a fragment of the orifice carrier plate.

Referring first to the orifice carrier plate 1, this involves a thin steel plate having an annular or disklike portion 2 at one end and an integral tang or dependent handle portion 3 at the other end of considerably less width than the annular portion 2. Annular or ring portion 2 has a multiple-stepped opening therethrough providing successive portions of increasing diameter, of which one provides an abutment shoulder 4 for detachably locating and seating the inner face of a detachable orifice fitting or disk 5 whose thickness presents its outer face in alignment with the adjoining face of the plate 1. The larger diameter step formation in the carrier ring 2 is shaped to provide an internal groove 6 for aligned cooperation with a mating external annular groove in the periphery of the orifice fitting 5. These cooperating grooves are for reception and interlocking fitment of an annular packing or O-ring 8 for sealing the interfitted surfaces of the orifice fitting 5 and its carrier disk 2. The flow opening through the orifice plate is shaped to provide a relatively thin small diameter cylindrical opening portion and a rearwardly flaring or frusto-conical portion of approximately three times the width of the cylindrical portion.

The dependent handle portion 3 contains a series of tool engageable formations conveniently in the form of a longitudinal succession of openings 9. Installation and particularly removal of the carrier plate assembly can be facilitated by engagement of a pry bar or tool in any of the openings 9 which are accessible when a closure plate is removed from the valve body without requiring any further disassembly of the valve unit.

The orifice carrying plate annulus 2 is for slide reception and close fit within a slot 10 of a generally spherical or ball-shaped valve plug 11 and which slot opens through one side of the plug in a plane substantially on the axis of plug rotation. Slot dimension is such as to completely traverse and extend across a passageway 12 projecting through the plug at right angles to the rotary axis of the plug.

In final assembly, the rotary plug 11 is mounted within a slightly enlarged space or chamber 13 positioned centrally of a casing or valve body 14 and from which project in opposite directions a pair of integral tubular extensions 15 and 16. The handle 3 of the orifice carrier plate is rotatable with the plug within the central enlarged portion of an opening 17 through the wall of the body 14 and which opening includes lateral wings or slots which lie in the axial direction of the tubular extensions 15 and 16. The slotted opening 17, except for the central enlarged portion, is generally of the size and shape of the slot 10 in the rotary plug and is for alignment therewith only when the plug has been rotated through a ninety-degree range of oscillation and to a position in which the plug passageway 12 is positioned transversely to the axis of the tubular extensions 15 and 16 of the body. Such alignment will accommodate slide movement of the carrier plate 1 relative to the valve plug when the outer end of the slot 17 is uncovered. As will be apparent, the relatively small area of the slot 17 in the wall of the body makes for body strength inasmuch as only a small amount of metal needs to be removed from the body wall.

For closing the outer end of the body slot 17, a removable cover 18, together with a suitable gasket, is held in place by clamp bolts 19. Four of such bolts are illustrated, of which two at one side may be threaded into pivotally mounted nuts 20 hung on a suitable pivot pin to the casing and located in spaced apart slots. Thus only the other two bolts need to be completely removed and the hinged bolts backed off slightly to allow the cover to swing to open position without the likelihood of misplacement and loss. The inner face of the cover 18 has a centrally depressed pocket to receive the terminal tip of the orifice plate handle 3 whose end face bears on the base of the depressed pocket. Upon removal of the cover, the tip portion of the handle 3 is exposed for easy access and plate manipulation. Should the plate be stuck or gummed in the valve plug, a suitable pry tool can be used to apply releasing force on the handle by engagement with the openings 9 as they become sucessively exposed.

Formed integrally with the ball plug 11 and projected from the side opposite the mouth of the slot 10 and on the rotatable axis of the plug is a circular operating stem 21 for bearing within a retainer cup or bushing 22 which is screwthreadedly secured within a tubular riser or boss 23 formed on the body 14 and projected from the side of the body opposite to the body wall containing the slotted opening 17.

Projected upwardly from the hollow boss 23 is a stop lug 24 for fitment within an arcuate slot of an adjustable cap 25. The slot is of a length to accommodate a ninety-degree rotation of the valve plug and to establish opposite limits of rotation and this cap is secured by a locking pin 26 to a dependent stud 27 which projects through the end wall of the retainer sleeve bearing 22 and terminates in a transverse key 28 for fitment to a mating slot 29 in the adjoining end of the plug stem 21. This key and slot interconnection transmits oscillation of the cap 25 for rocking the valve plug 11 between its opened and closed positions. For latching the cap 25 in open position, its underside is provided with a pocket for alignment and reception of a spring pressed plunger 30 having an operating handle 31. The provision at the underside of the cap of a similar pocket will enable retention of the part at the other limit of travel and alignment with the latching plunger 30 when the cover 25 is rotated to valve closing position.

The lateral extension 15 is internally screwthreaded and has fitted thereto a tubular coupling member 32 terminating outwardly in a coupling flange 33 for connection with a pressure fluid delivery line such as a well production pipe at a well head. An external lug 34 on the tubular coupling has stop engagement with the end of the extension 15 and properly locates an annular groove at the inner terminal of the coupling 32 in relation to the adjoining ball surface of the plug 11. Fitted within the groove is an annular seal 35 of Teflon or other suitable pliable material for bearing contact with the rotary plug. An annular retainer ring 36 surrounds and backs up the seal ring 35. By separately forming and detachably connecting the tubular coupling member 32, other similar coupling members, each with a central inlet passage 37, will enable the same body and plug to be employed with a range of flange faces and pressure ratings.

Similarly, the outflow coupling 38, containing a passageway 39, can be one of a set of interchangeable couplings each having different flange faces and pressure ratings and its terminal flange 38' can be joined to an outgoing pipe of a fluid gathering line or the like. The inner end of the tubing coupling 38 is screwthreaded into the tubular extension 16 of the body and termnates inwardly in an annular groove to contain a retainer ring 40 for seal ring 41 to engage the ball surface of the plug. The internal diameter of the tubular extension 16 is illustrated as being only slightly larger than ball plug diameter and the purpose thereof is to facilitate assembly and disassembly of the plug endwise or in the axial direction of the tubular extension somewhat as illustrated in FIG. 6. Thus the first step in assembling the part will be to introduce the ball plug with its stem 21 first projected through the body extension 16 until the end of the stem comes into alignment with the tubular boss 23, whereupon the ball will be rocked for the entrance of the stem into the boss 23 as the ball portion moves on into the central chamber of the body. Thereafter, the parts can be successively fitted to the stem and the coupling members 32 and 38 moved into final assembly relation, followed by the introduction of the orifice plate and the closure of the body by application of the cover 18.

As seen in FIGS. 3, 4 and 5, the central hollow boss 23 is formed with a pair of lateral bosses 42 and 43 to receive pipe connections leading to suitable pressure gauging mechanism. The hollow boss 43 is open inwardly into the chamber space 13 which in turn communicates through a drilled passageway 44 in the ball plug, with the inlet side of the passageway 12 when the plug is in open position. The other hollow boss 42 communicates at its inner end with an annular space 45 interiorly of the hollow boss 23 and through one or more lateral openings in the bushing 22 and an annular internal groove 46 in the bushing. The latter groove 46 communicates with lateral branches of a cored passageway 47 in the plug stem 21 from which a drilled passageway 48 leads into a plug passageway 12 on the far side of the orifice plate. Thus pressure differentials on opposite sides of the orifice can be gauged during normal flow operation.

When an orifice plate needs to be removed in an operating installation, the plug valve will first be rotated to turn its passageway 12 at right angles to the flow passage 37 and thereby block fluid flow. At such time, the valve chamber 13 will still confine pressure fluid and in order to relieve such pressure prior to removal of the cover bolts 19, a vent valve arrangement is provided, as best seen in FIG. 4. Here, there is shown a needle valve 49 screwthreaded into an attachment bushing 50 which is fitted as by screw threads into a lateral opening in the valve body 14. The inner end of the bushing 50 mounts a bushing 51 of Teflon or the like to provide a seat for the needle valve 49. The bore through the nipple 51 communicates by a drilled port 52 with the interior of the valve chamber 13 and beyond the valve the bushing 50 has a lateral port for communication with the vent opening 53 in the valve body. Normally, the needle valve 49 is closed but can be backed away from its seat for the relief of pressure within the chamber when the valve plug has been rotated to closed position.

After an orifice plate has been replaced within the valve plug and is followed by replacement of the closure cover 18, it is proposed to again pressurize the valve chamber 13 before the valve plug is moved in order to reduce the likelihood of such movement imposing injurious stress on the annular seals 35 and 41. For that purpose, a lateral port 54 is drilled through the wall of the tubular coupling 32 to communicate its passage 37 with an external annular groove 55. Preferably, a pair of annular O-rings 56 are disposed on opposite sides of the groove 55 to seal against the adjacent internal cylindrical surface of the tubular extension 15 of the body. From the annular groove 55 a drilled port 57 (see FIG. 5) leads to a chamber in a needle valve assembly including the needle valve 58 screw-threaded into a bushing 59 which in turn is screw-threaded into a pocket in the valve body. The needle valve seats on one end of a nipple 60 forming a part of housing 59 and an outwardly opening ball check valve 61 seats at the opposite end of the nipple 60. Beyond the check valve 61, the chambered housing 59 communicates through a passageway 62 with the interior of the valve chamber 13, of which the slot 17 constitutes a continuation. Normally, the needle valve 58 is closed but prior to valve plug return movement from closed position, the needle valve will be opened for a sufficient interval to equalize the pressure within the valve chamber 13 with that in the inlet passage 37. Once the plug valve is returned to fully open position, the passageway 44 will be effective for maintaining the valve chamber 13 at inflow pressure and the needle valve 58 can again be manually shut off.

The foregoing description has dealt with a preferred embodiment of the improved orifice valve assembly and the same may be variously modified within the scope of the appended claims.

What is claimed is:

1. In an orifice valve assembly, a body having a flow passage therethrough, a plug rotatably mounted in the body for valving said passage and provided with a flow passageway projected therethrough transversely of the axis of plug rotation, an operating formation carried by the plug on one side thereof for transmission of rotation thereto, said plug having a narrow plate receiving slot which opens into the plug from the side thereof opposite said operating formation and is extended internally of the plug across and in intersecting relation with said flow passageway in the plug, an orifice containing carrier plate comprising a disklike main portion for slidable reception in said slot in the plug and a prong handle portion for projection from the main portion beyond the plug and on the axis of plug rotation, said body having an opening coaxial with said axis for receiving said prong handle and accommodating handle rotation with the plug and also having slotted portions projected oppositely from said opening for aligned co-operation with the slot in said plug only when the same is in body passage closing position and a removable closure member secured to the body to close said opening and the slotted portions projected oppositely from the opening, said prong handle carrying manipulative tool engageable formations which are exposed for manipulation when the casing closure member is removed.

2. In an orifice valve assembly, a body having a flow passage, a valve plug rotatably housed by the body on an axis transverse to said passage and provided with a passageway which is shiftable with the plug into and out of alignment with the passage in the body, said plug having an internal slot at the axis of plug rotation and which slot traverses said passageway and opens through the plug at one side thereof and the wall of the body at said side of the plug having a corresponding narrow slot with which the plug slot can be aligned as a continuation thereof only at the plug rotation position in which the plug passage is out of alignment with the passage in the body, a cover secured detachably to the body as a closure for the slot therein, a flow orifice carrying plate removably fitted within the plug slot and shiftable into and out of the plug slot upon alignment thereof with the body slot and a dependent relatively narrow tang depending from said plate to extend rotatably through the central region of said body and terminally bearing on said cover.

3. In an orifice valve assembly, a rotary valve plug having a flow passageway extending therethrough transversely of the rotational axis of the plug, an operating stem projected from one end of the plug on said axis, an internal formation within said plug forming an orifice plate receiving slot which is relatively thin and is wider than said passageway and traverses the same substantially on said axis and terminates in an open end at the side of said plug opposite to its operating stem, a hollow casing having a central space to enclose said plug for rotation between limits of valve opened and closed positions and also having projected in the axial direction of the plug a stem receiving pocket on one side of said space and a slot extending through the casing wall on the other side of said space and being dimensioned to substantially correspond with the slot in said plug as a continuation thereof only upon alignment therewith in plug closed position, an orifice plate fitted to the slot in said plug and insertable and removable therefrom by axial passage through the casing wall slot only while the plug is in its closed position and aligns the slots with one another and a cover detachably secured to the casing in closing relation to the casing wall slot.

4. As an article of manufacture, a retainer plate to be replaceably positioned within a valve plug and provided with a double-stepped wall surrounding an opening therethrough and with an internal annular groove in the larger stepped portion of said wall, an orifice disk fitted to the smaller step portion of said double stepped wall, said disk having a flow orifice therethrough defined by a cylindrical wall portion and a frusto-conical wall portion which flares outwardly from the cylindrical wall portion and said disk also having an annular groove in the periphery thereof for aligned co-operation with said internal annular groove in the larger stepped portion and a sealing ring fitted to and retained within the two co-operating annular grooves.

5. In an orifice valve assembly, a rotary valve plug having a flow pasageway extending therethrough transversely of the rotational axis of the plug, an operating stem projected from one end of the plug on said axis, an internal formation within said plug forming an orifice plate receiving slot which is relatively thin and is wider than said passageway and traverses the same substantially on said axis and terminates in an open end at the side of said plug opposite to its operating stem, a hollow casing having a central space to enclose said plug for rotation between limits of valve opened and closed positions and also having projected in the axial direction of the plug a stem receiving pocket on one side of said space and a slot extending through the casing wall on the other side of said space and being dimensioned to substantially correspond with the slot in said plug as a continuation thereof only upon alignment therewith in plug closed position, said hollow casing including a tubular end extension projecting from said space and being of an internal diameter to pass said plug into and out of assembly relation within said space, a coupling connection detachably fitted within said tubular extension in plug retaining bearing relationship, an orifice plate fitted to the slot in said plug and insertable and removable therefrom by axial passage through the casing wall slot only while the plug is in its closed position and aligns the slots with one another and a cover detachably secured to the casing in closing relation to the casing wall slot.

6. In an orifice valve assembly, a hollow body having a central space and inlet and outlet passages extended to and from said space and also having a lateral opening into said central space through the wall of the body, a valve plug rotatably mounted in said central space and provided with a passageway to be rotated with the plug into and out of alignment with said passages, sealing means between the body and the plug separating said space from the passages, said lateral opening comprising a narrow elongate slot whose longitudinal extent parallels said passageway when the passageway is in alignment with said passages, said plug having an orifice plate receiving slot opening thereinto from adjacent said lateral opening and traversing said passageway, an orifice plate fitted to said slot in the plug and insertable and removable from the same only when the rotatable plug is positioned with its passageway out of alignment with said passages and with its slot aligned with the narrow slot in the body and a cover closing the lateral opening and detachably secured to the body.

References Cited by the Examiner

UNITED STATES PATENTS

| | | | |
|---|---|---|---|
| 1,972,151 | 9/34 | Link | 251—118 XR |
| 2,007,036 | 7/35 | Cornell | 138—44 |
| 2,041,282 | 5/36 | Brooks | 138—44 XR |
| 2,236,873 | 4/41 | Hamer | 251—118 XR |
| 2,585,290 | 2/52 | Walker | 138—44 XR |
| 2,688,987 | 9/54 | Whalen | 138—44 |
| 2,866,213 | 12/58 | McArthur | 251—283 XR |
| 2,912,219 | 11/59 | Clade | 251—315 |
| 3,042,066 | 7/62 | Wolfensperger | 251—283 XR |

ISADOR WEIL, *Primary Examiner.*